United States Patent
Kowal et al.

(10) Patent No.: US 9,442,473 B2
(45) Date of Patent: Sep. 13, 2016

(54) REMOTE OBJECT DATA PROPERTY REPLICATION METHOD AND SYSTEM

(71) Applicant: ROCKWELL AUTOMATION TECHNOLOGIES, INC., Mayfield Heights, OH (US)

(72) Inventors: Steven John Kowal, Milwaukee, WI (US); Gregory James Piller, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/523,268

(22) Filed: Oct. 24, 2014

(65) Prior Publication Data

US 2015/0045917 A1  Feb. 12, 2015

Related U.S. Application Data

(63) Continuation of application No. 12/242,007, filed on Sep. 30, 2008, now Pat. No. 8,875,156.

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G05B 15/02 | (2006.01) |
| G05B 19/042 | (2006.01) |
| H04L 29/08 | (2006.01) |

(52) U.S. Cl.
CPC ......... G05B 15/02 (2013.01); G05B 19/0426 (2013.01); H04L 67/10 (2013.01); *Y02P 90/265* (2015.11)

(58) Field of Classification Search
None
See application file for complete search history.

(56) References Cited

U.S. PATENT DOCUMENTS

| | | | | |
|---|---|---|---|---|
| 6,292,827 | B1 * | 9/2001 | Raz | ................................ 709/217 |
| 7,302,697 | B1 * | 11/2007 | Wilson | ..................... H04N 5/76 348/E7.061 |
| 2003/0033037 | A1 * | 2/2003 | Yuen et al. | ..................... 700/86 |
| 2008/0282182 | A1 * | 11/2008 | Oosaka | ......................... 715/772 |

* cited by examiner

*Primary Examiner* — Craig Dorais
(74) *Attorney, Agent, or Firm* — Fletcher Yoder, P.C.

(57) ABSTRACT

In one embodiment, a method is provided that includes designating a visual representation of an object in a display screen of a human machine interface, accessing any properties, connections, and text associated with the object in response to a trigger event, and creating an identical copy in response to the trigger event, wherein the identical copy includes any properties, connections and text associated with the object. An interface system that includes a machine readable medium having programming code implementing the method. An industrial automation device is also provided.

18 Claims, 8 Drawing Sheets

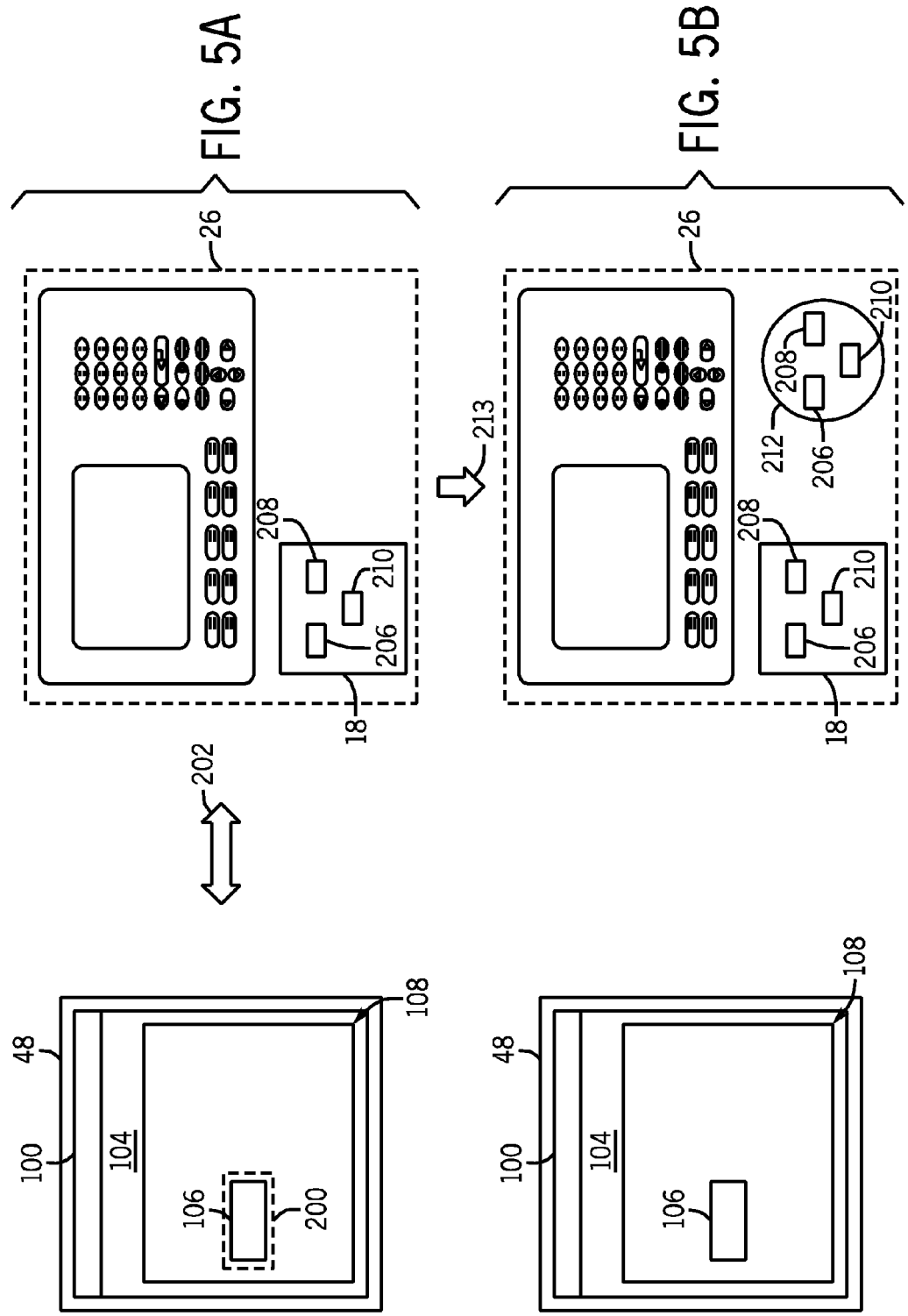

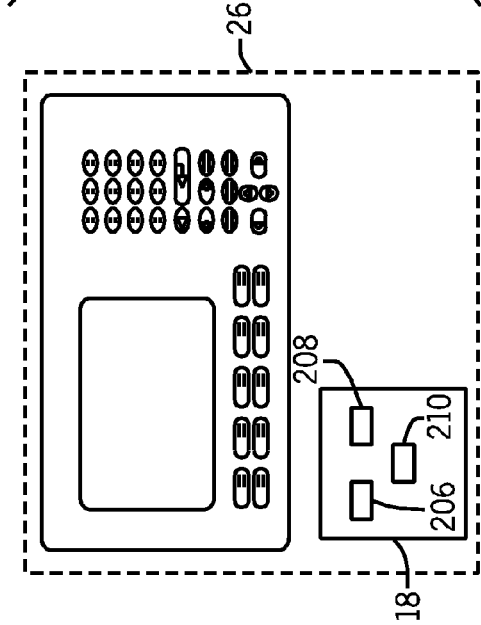
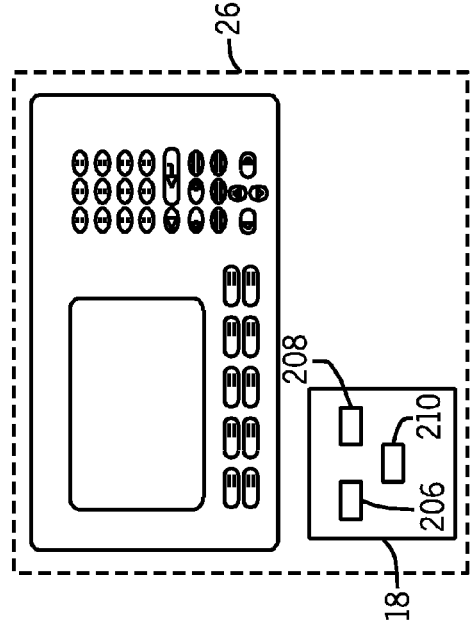
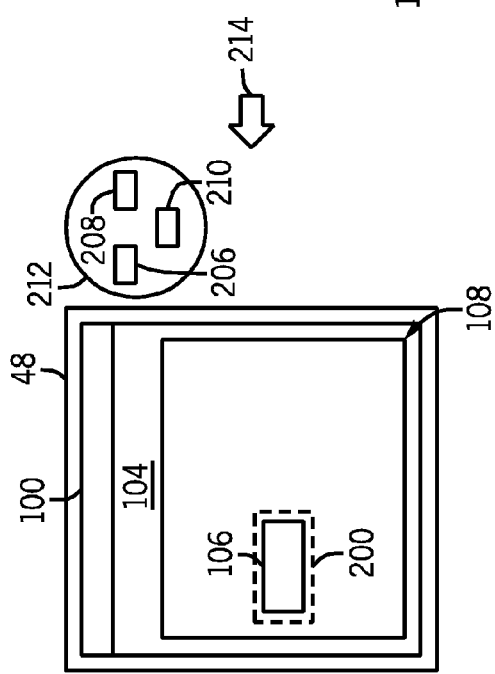
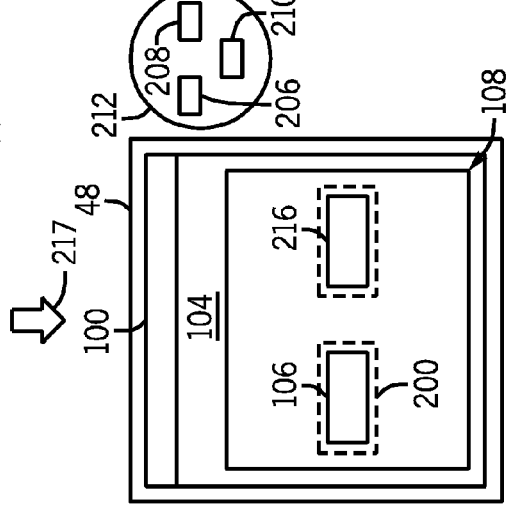
FIG. 5C
FIG. 5D

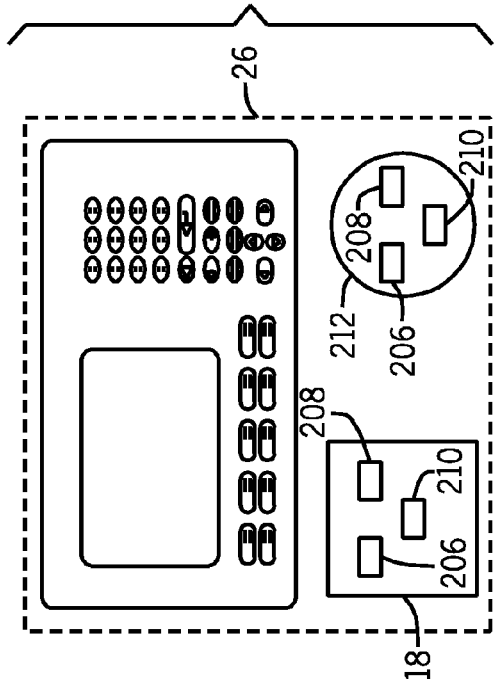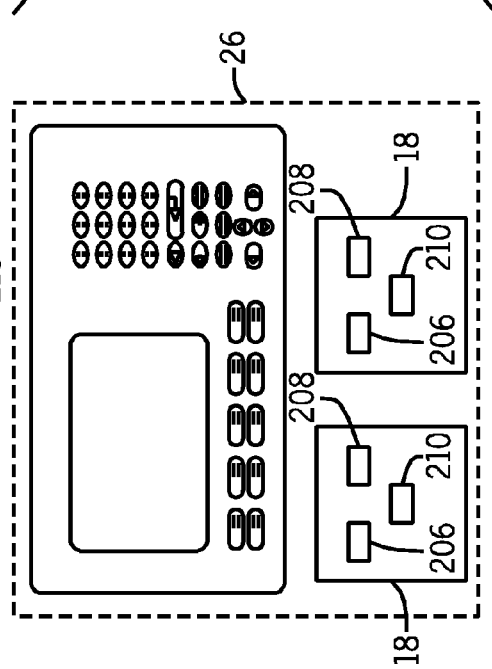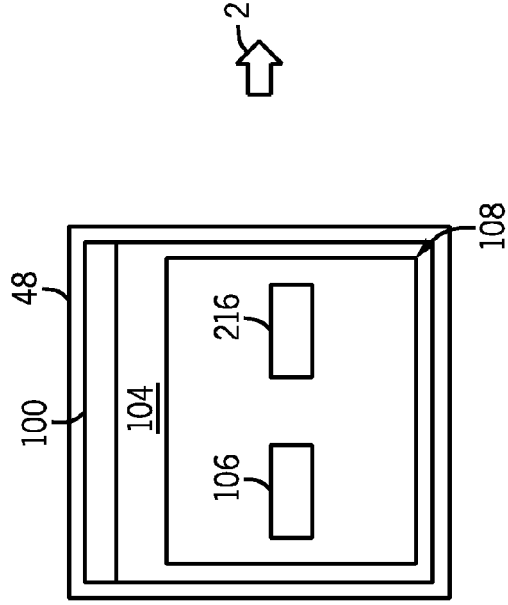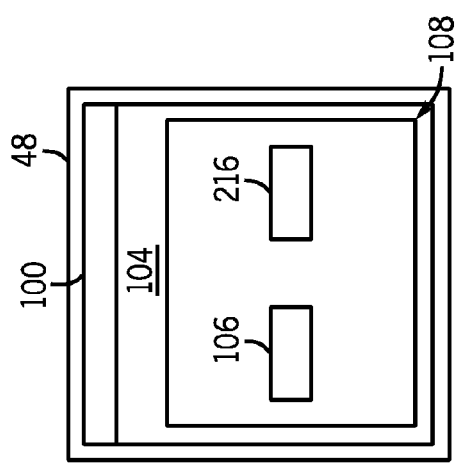

REMOTE OBJECT DATA PROPERTY REPLICATION METHOD AND SYSTEM

CROSS REFERENCE TO RELATED APPLICATIONS

This application is a Continuation patent application of U.S. patent application Ser. No. 12/242,007, entitled "Remote Object Data Property Replication Method and System", filed Sep. 30, 2008, which is herein incorporated by reference.

BACKGROUND

The present invention relates generally to the field of interface devices and to their configuration and programming. More particularly, the present invention relates to techniques for manipulation of objects of industrial automation devices and their visual representations on the interface devices.

A wide range of interface devices are known and are presently in use in many different fields. In industrial automation, for example, human machine interfaces or "HMIs" are commonly employed for monitoring or controlling various processes. The HMIs may read from or write to specific registers such that they can reflect the operating state of various machines, sensors, processes, and so forth. The interfaces can also write to registers and memories such that they can, to some extent, control the functions of the process. In monitoring functions alone, little or no actual control is executed. In many other settings similar devices are employed, such as in automobiles, aircraft, commercial settings, and a host of other applications. In many applications, the interface may not communicate with a remote device or process, but may be operated in a stand-alone manner.

In these interface devices, various objects used in the interface may correlate to different controls, monitors, or any other parameter of an industrial automation device. Some of these objects may have visual representations on the interface devices, while other objects may not be visually represented but may be accessible for configuration and programming by a user. A user may desire to manipulate these objects, such as by creating new objects, copying objects, pasting objects, etc., to create and customize an interface.

In some instances, a user may access the interface devices via a client such as a web browser. In either case, the performance and responsiveness of the interface device or web browser may be affected by manipulation of the objects of the interface device. For example, the caching functionality of the web browser may result in caching a large amount of objects in memory, thus reducing the amount of memory available for execution of the interface. Additionally, transfer of data between the web browser, the interface device, and the industrial automation device may also affect the performance and responsiveness of the interface device and web browser.

BRIEF DESCRIPTION

The present invention provides a novel approach to interface device management and configuration designed to respond to such needs. The approach uses visual representations of a plurality of device elements operative on the interface device. A user may trigger an event on a device element, such as replicating the device element, and a user may also desire to replicate the properties, connections, and text associated with a device element. An identical copy may be created in response to the event, so that the identical copy includes the properties, connections, and text of the original device element.

Methods, devices, and computer programs are all supported for performing these and other functions of the invention.

DRAWINGS

These and other features, aspects, and advantages of the present invention will become better understood when the following detailed description is read with reference to the accompanying drawings in which like characters represent like parts throughout the drawings, wherein:

FIGS. 5A-5F are an overview of replication of a device element of an interface in accordance with an embodiment of the present invention.

DETAILED DESCRIPTION

Figure 1:
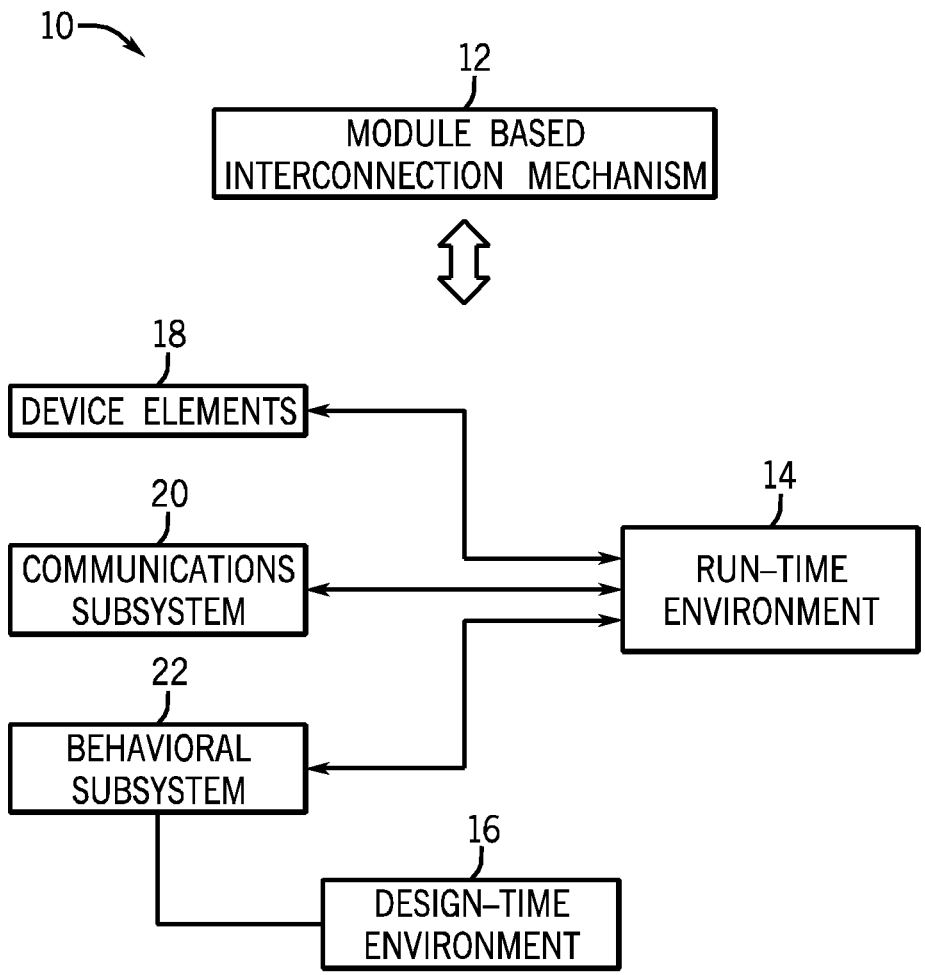
FIG. 1 is a general overview of a framework for an interface configuration system in accordance with certain aspects of the present invention.

A number of facets, components and processes will be described through the following discussion. By way of introduction, a general system overview is in order that situates these innovations in context. FIG. 1 is a diagrammatical representation of an control and monitoring software framework 10 for an interface in accordance with an embodiment of the present invention. The framework 10 facilitates building functional software by utilizing a module based interconnection mechanism 12, which inherently supports dynamic manipulation and configuration. This dynamic manipulation and configuration ability facilitates efficient provision of feature-rich configuration environments for configurable interfaces. That is, as described below, individual device elements are provided as stand-alone code that can be individually programmed, pre-written for use, as in a library, customized in their function and appearance in screens, and interconnected to provide information to a user as well as monitoring and control functions.

The framework 10 includes two interrelated software environments that can reside on a single system (e.g., computer). Specifically, A run-time environment 14 enables an operator (e.g., a human user) to interact with an application, such as a process during run-time (e.g., during use of the interface, typically during interaction with or observance of a process in operation). A design-time environment permits a designer to configure the interface and its components. For example, a system may graphically present run-time information to an operator via the run-time environment 14 on a display (e.g., computer or interface device screen). Further, the system may include means (e.g., a keypad) for accepting operator input that can be detected and managed via the run-time environment. The environments interact as described in detail below, in innovative ways to provide greatly enhanced programming and use of the interface.

The run-time environment includes or provides access to device elements 18. The device elements 18 are software components that may include any accessible or configurable element in a software environment. For example, the device elements 18 include software components, such as "ActiveX" controls or ".NET" components that are managed by the run-time environment 14. "ActiveX" and ".NET" refer to object-oriented concepts, technologies and tools. Those skilled in the art will be well-acquainted with such programming approaches generally. In the present context, such standards should be taken as merely examples, and "device elements" should be understood as including any generally similar components or self-sufficient programs that can be run as quasi-independent elements, sometimes referred to as "objects". Other standards and platforms exist for such elements, typically championed by different companies or industry groups.

Because such device elements are basic to certain of the inventive concepts, a few words of introduction are in order. Device elements generally include four features: properties, methods, connections (or connection points) and communications interfaces. Properties are attributes that can be adjusted, such as to define an image or representation of the element in a screen view, as well as its location on the screen, and so forth. A method is an executable function (sometimes referred to herein as the elements "functionality" or "state engine"), and defines an operation performed by execution of the element. A connection is a link between elements, and can be used to cause data (read from a memory or written to a memory) to be sent to another element.

Specific examples of device elements 18 may include software pushbuttons, timers, gauges, PLC communication servers, screens, and applications. In general, virtually any identifiable function may be configured as such an element. Moreover, as discussed below, such elements may communicate with one another to perform a wide range of display, monitoring operations and control functions. It should be noted that device elements 18 do not require special limitations for supporting a design mode. Also, while elements associated with an image are quite useful, particularly for screen views, many elements may not have a visual representation, but may perform functions within an HMI, such as calculations, or even management and data exchange between other elements.

The run-time environment typically operates using a communications subsystem 20. The communications subsystem 20 is adapted to interconnect the device elements 18. In practice, the communications subsystem 20 may be thought of as including the connections of the device elements. However, it may include a range of software, hardware and firmware that send data to and receive data from external circuits, such as PLC's, other computers, networks, satellites, sensors, actuators, and so forth.

The run-time environment typically operates using a behavioral subsystem 22, which is adapted to manage the behavior of the device elements 18. For example, responsibilities of the behavioral subsystem 22 may include the following: place and move device elements, modify device elements, group device elements on interchangeable screens, save and restore screen layouts, manage security, save and restore connection lists, and supply remote access to the run-time environment 14. Here again, in practice, such behaviors may be defined as part of the profile (i.e., the "method" or "state engine") of each device element.

The design-time environment 16 includes an advanced implementation of the behavioral subsystem 22 that facilitates direct or indirect manipulation of the run-time environment 14, without impeding or compromising the behavior of the run-time environment 16. That is, design and reconfiguration can be done even while an interface is operating. The behavioral subsystem 22 extends access to the run-time environment 14 via remote provision of the design-time environment 16, such as in a conventional browser. The behavioral subsystem 22 allows a designer to interact with and change aspects of the run-time environment 14 of an HMI via a remote configuration station by serving the design-time environment or aspects thereof to the configuration station from the HMI. For example, an HMI coupled to a laptop via a network may provide a user with configuration capabilities by serving up a specific design-time environment to the laptop via the network.

Details and examples of how this may be done are provided below. In current embodiments, the design-time environment may be a product of combining Dynamic Hypertext Markup Language (DHTML) and an Active Server Page (ASP) server scripting to serve dynamic content to a browser. An ASP script is specially written code that includes one or more scripts (i.e., small embedded programs) that are processed on a server (e.g., Web server) before the page is sent to a user. Typically, in conventional usage, such script prompts a server to access data from a database and to make a change in the database. Next, the script typically builds or customizes the page before sending it to the requestor. As discussed below, such scripting is used in the present framework quite differently, such as to build screen views without prior knowledge of either the functionality of device elements, or their interrelationships.

By facilitating changes to device elements, the design-time environment allows the designer to make interchangeable design-time models or specialized implementations of the behavioral subsystem 22. A specific example of a design-time implementation of the behavioral subsystem 22 includes a Web-based design-time environment, which extends access to a run-time environment on an HMI via a TCP/IP connection between the HMI and a remote device. The Web-based design-time environment facilitates management of the device elements without compromising run-time performance or security. In one specialized implementation the behavioral subsystem 22 gives designers the ability to manipulate aspects of the run-time environment 14 using a Web browser that is capable of accessing a related interface or HMI. As noted above, and as described in detail below this is achieved by using a combination of dynamic content, scripting, and configuration of the device element properties.

Figure 2:
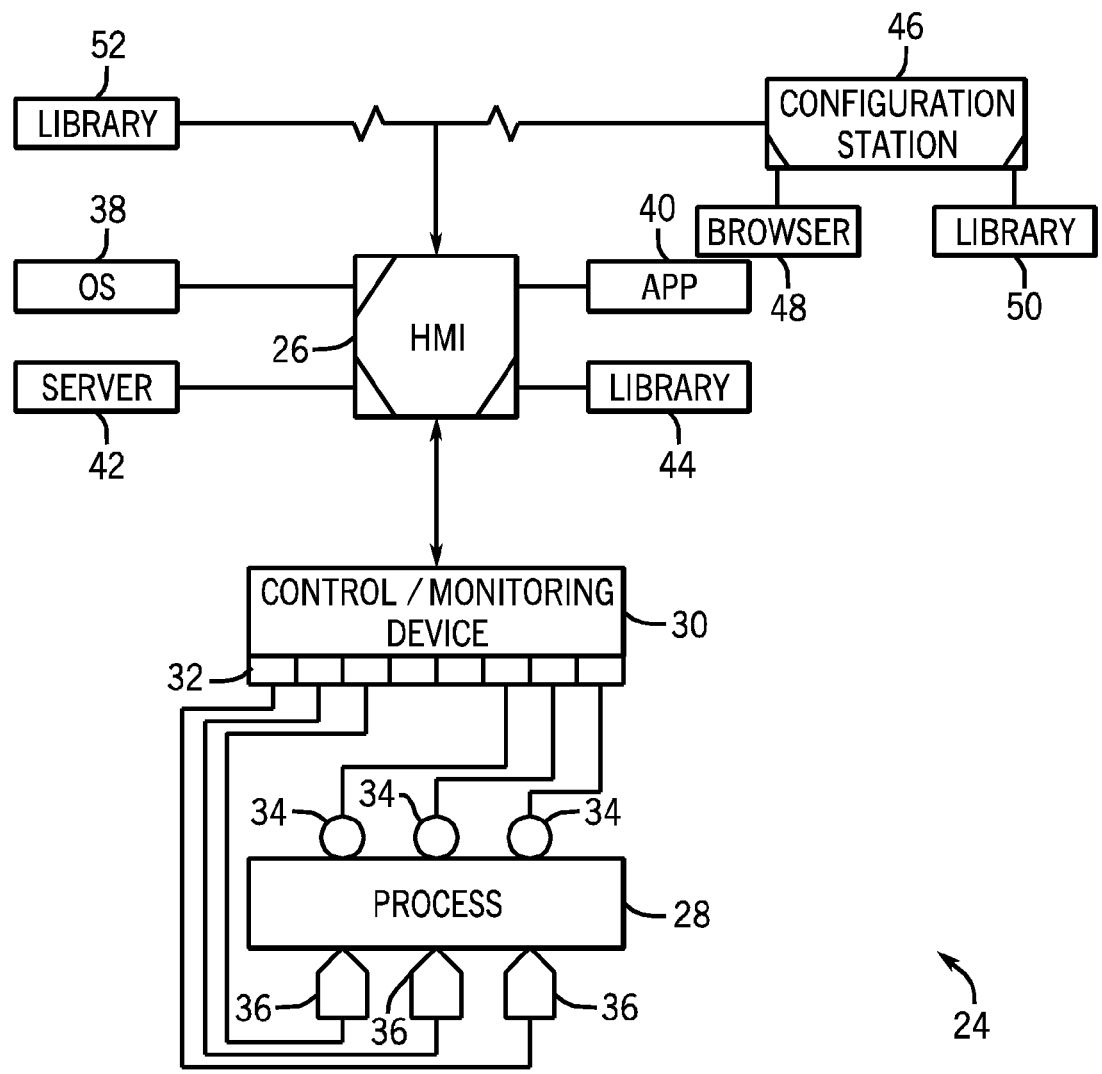
FIG. 2 is a diagrammatical overview an interface for monitoring or controlling a process in accordance with an embodiment of the present invention.

FIG. 2 is a diagrammatical representation of a control and monitoring system 24, such as for industrial automation, implementing the framework described above in accordance with an embodiment of the present invention. The system includes an HMI adapted to interface with networked components and configuration equipment. The system 24 is illustrated as including an HMI 26 adapted to collaborate with components of a process 28 through a control/monitoring device 30 (e.g., a remote computer, programmable logic controller (PLC) or other controller). The HMI 26 may physically resemble existing hardware, such as a panel, monitor or stand-alone device.

Collaboration between the HMI 26 and components of the process 28 may be facilitated by the use of any suitable network strategies. Indeed, an industry standard network may be employed, such as DeviceNet, to enable data transfer. Such networks permit the exchange of data in accordance with a predefined protocol, and may provide power for operation of networked elements. As noted above, while reference is made in the present discussion to networked systems and to systems incorporating controllers and other equipment, the HMI 26 and programming techniques described may be equally well applied to non-networked components (e.g., GPS displays, game displays, cell phone displays) and to networked systems outside the industrial automation field. For example, the arrangements and processes described below may be used in facilities management, automotive and vehicular interfaces, computer numeric control (CNC) machines, point of sale (POS) systems, control interfaces for commercial markets (e.g., elevators, entry systems), and so forth, to mention only a few.

The run-time or operation environment constructed and managed by a corresponding behavioral subsystem, is stored on and resident in the HMI 26. For example, such a behavioral subsystem can be adapted to load the application configuration framework (e.g., 10) from a storage location, such as during initial manufacture or setup of the HMI. When loaded, the stored application framework may be adapted to create screens and locate user interface device elements (actually images or pictorial representations corresponding to the elements) in the screens. These applications, screens, and user interface elements are each types of device elements. As described below, the HMI 26 includes a stored application that dictates the layout and interaction of the device elements. The Web-based design-time environment, which is based on a run-time engine, is also loaded and resident on the HMI. The design-time environment may be adapted to handle advanced features (e.g., security management) for both design-time and run-time environments.

The HMI may be adapted to allow a user to interact with virtually any process. For example, the process may comprise a compressor station, an oil refinery, a batch operation for making food items, a mechanized assembly line, and so forth. Accordingly, the process 28 may comprise a variety of operational components, such as electric motors, valves, actuators, sensors, or a myriad of manufacturing, processing, material handling and other applications. Further, the process 28 may comprise control and monitoring equipment for regulating process variables through automation and/or observation. The illustrated process 28 comprises sensors 34 and actuators 36. The sensors 34 may comprise any number of devices adapted to provide information regarding process conditions. The actuators 36 may similarly include any number of devices adapted to perform a mechanical action in response to an input signal.

As illustrated, these sensors 34 and actuators 36 are in communication with the control/monitoring device 30 (e.g., a PLC) and may be assigned a particular address in the control/monitoring device 30 that is accessible by the HMI 26. The sensors 34 and actuators 36 may be in direct communication with the HMI 26. These devices may be utilized to operate process equipment. Indeed, they may be utilized within process loops that are monitored and controlled by the control/monitoring device 30 and/or the HMI 26. Such a process loop may be activated based on process inputs (e.g., input from a sensor 34) or direct operator input received through the HMI 26.

The server software on the interface permits viewing of the development environment, and direct reconfiguration of the interface (particularly of the device elements and their associated appearance and functionality) without the need for special viewing or configuration software. This benefit flows from the fact that the device elements and the design-time environment itself is resident in the HMI, and "served up" by the HMI to a browser or other general purpose viewer on the configuration station. In other words, necessary support for external computer workstations (e.g., laptop and desktop computers) may be reduced or eliminated. It should be noted that reference to a "browser" for viewing and modifying configuration of the interfaces is not limited to Web browsers or to any particular browser. References to a browser are intended to be exemplary. More generally, the term "browser" is utilized herein to reference software which includes any general purpose viewer.

The HMI 26, through the programming of the device elements as described below, may be thought of as including instructions for presenting one or more screen views, and device elements executed upon interaction with the HMI by reference to the screen views (e.g., pressing a button, touching a location of a screen, and the like). The screen views and device elements may be defined by any desired software or software package. For example, the screen views and device elements may be called by or executed by an operating system 38. The device elements, as discussed above, in accordance with present embodiments, are objects conforming to ".NET" or "ActiveX" standards. The operating system itself may be based upon any suitable platform, such as Window CE. As referenced herein, the device elements and tools support Web services or technology for transmitting data over networks (e.g., the Internet). These device elements thus follow a set of rules regarding information sharing and are adapted for use with various scripting and programming languages, as described below. Such device elements enable provision of interactive content to outside applications such as a LAN, WAN, an intranet, an extranet, or even the World Wide Web. Accordingly, the operating system 38 and the various device elements facilitate dynamic configuration of the HMI 26 through a browser by allowing configuration access (e.g., serving up) to the browser.

For example, such configuration access includes access for instantiation of device elements. In other words, new device elements can actually be created and implemented from the browser. Again, it should be noted that the browser does not require actual functional access. Indeed, in one embodiment, requests via the browser result in a "draw" sequence of operations based on data functionality and content of device elements in a container, thus allowing illustration of the device element representations and access to their configuration without actually serving up functional aspects. This allows for configuration via a remote workstation without necessitating technical support for the remote workstation. Such aspects are described in greater detail below.

In addition to the operating system and device elements as described above (and as described in greater detail below), the HMI 26 includes an application or application layer 40. The application, which may itself comprise a device element, facilitates access to and acquisition of information from the various device elements of the HMI. In particular, the application 40 represents a first level in a multi-level device element that can be enumerated for execution. The application 40 in a practical implementation may comprise a user application in the form of an XML page. The user application is then interacted with by the user or operator, as well as by the designer as described in greater detail below.

The screen views and device elements may be described as independent executable pieces of software. In a present implementation, the screen views are defined by appropriate code written in a markup language (e.g., Hypertext Markup Language or HTML). Thus, the configuration of graphical interface screens for the HMI 26 may be performed without the use of conversion programs. Further, by programming of the device elements, the screen views may be developed directly on the HMI 26 via resident server software (designated as server 42) that makes the resident development environment available for remote access. Specifically, in one embodiment, representations of certain device elements (e.g., ActiveX controls) are served up to the browser without serving up the software components themselves. Because a development or design-time environment may be accessed via a browser, the need to download changes to the screens and to update remote configuration software applications can be eliminated.

As noted above, device elements may include functionality by which they read from or write to specific memory or registers of memory, typically in other devices (but which could also be within the HMI). For example, a particular function may correspond to writing to or reading from a register 32 of control/monitoring device 30. In a simple case, for example, an object simply accesses a piece of data (e.g., a state of a component as determined by a sensor), and generates an output signal to write a value corresponding to the state of a different networked device. Much more complex functionality can, of course, be configured. In an industrial control and monitoring context, for example, such device elements may emulate operation of a range of physical components, such as a momentary contact push button, a push button with delayed output, a switch, and so forth. Many pre-programmed device elements may be available for use by the HMI 26. Such functional modules may be accessible via a network, or may be resident on the HMI 26, or resident on a separate device directly linked to the HMI 26. In this way, an HMI supplier or software supplier may provide many possible building blocks from which screens and complex control and monitoring functions may be programmed. Indeed, a library 44 of available device elements may reside on the HMI 26 to facilitate configuration of the HMI 26, as described below. The screen instructions may call upon the device elements for performing desired functions based upon operator inputs, and these instructions may be programmed into versions of the pre-programmed elements. For example, the operator may provide initiating inputs by touching a location on a touch screen or depressing keys on a keyboard. Based upon the screen instructions and the device elements associated with the instructions (e.g., with specific locations triggering calls or execution of pre-configured device elements) the desired functions may then be executed. Accordingly, the operator is enabled to interact with a process, typically to change screen views, write to registers, or command the generation of other output or control signals. In a stand-alone implementation, the interactions may simply recall or store data, change screens, and so forth.

One or more separate interface screens may be employed, with some HMIs having many such screens and a great number of device elements. Each device element may, in turn, be uniquely programmed to consider specific inputs, perform specific functions, and generate signals for specific outputs. A plurality of such device elements can be loaded and hosted in a single software "container" (e.g., ActiveX container) as described below.

The HMI may be configured by interacting directly with a panel or screen on the HMI itself (if one is present), but in many cases configuration will be performed from a remote configuration station 46. For example, access is provided directly to the resident library 44 and/or operating system 38 and application 40 via a browser 48 or similar application. In a present implementation, no other specialized software is required at the configuration station 46. Indeed, the server 42 resident on the HMI 26 may provide access to the device elements in library 44. By storing the device elements in library 44 directly on the HMI 26, the risk of version conflicts and so forth are eliminated or reduced. Additionally, the HMI may be directly connected to the configuration station, or accessed by reference to an IP address (Internet Protocol address) assigned to the HMI 26.

Access control schemes may be used to limit the ability to change screens and device elements. For example, a password or user access status may be required to gain such access. Further, in a presently contemplated embodiment, the configuration station automatically recognizes the HMI or the terminal on which the HMI is resident as a device upon being coupled to the configuration station (e.g., similar to an external memory or drive). Thus, once connected to the configuration station, the HMI may simply be "recognized" as a device that can be accessed (providing the configuration screen and tools described below).

Once the device elements then resident on the HMI 26 are accessible to the configuration station 46, aspects of the HMI 26 can be modified or updated directly on the HMI 26 via the communication link from the configuration station 46. For example, a user may wish to update a particular HMI graphic to provide data, such as historical data or trending relating to information being received from a newly installed sensor 34. Additionally, the user may find it desirable or convenient to update the HMI graphic for presentation of such data while in an off-line mode (e.g., without immediately implementing the changes). In such a scenario, the user may link to the library 44 of available device elements via the configuration station 46 and use them to modify the HMI graphic or functionality in a development environment.

It should be noted that additional device elements can be added to the library 44. For example, if a trending device element is not resident on the HMI 26, a user can download such an element to the HMI 26 from a configuration library 50 resident on the configuration station 46. Alternatively, a user could access the trending device element from a resource library 52 accessible via a network (e.g., the Internet), either directly to HMI 26 or through the configuration station 46. This may be particularly beneficial because new and improved device elements can be downloaded to the HMI 26 individually and on a periodic basis, thus adding new functionality without necessitating the periodic release of new conversion programs or HMI operating systems, or run-time or design-time environment software. The development environment may provide links to such libraries. Further, in embodiments using embedded code (e.g., operating system, server software, device objects, etc.), because the embedded code resides on the HMI 26, version conflicts with the embedded code may be avoided and the necessity for configuration station software upgrades may be eliminated.

Figure 3:
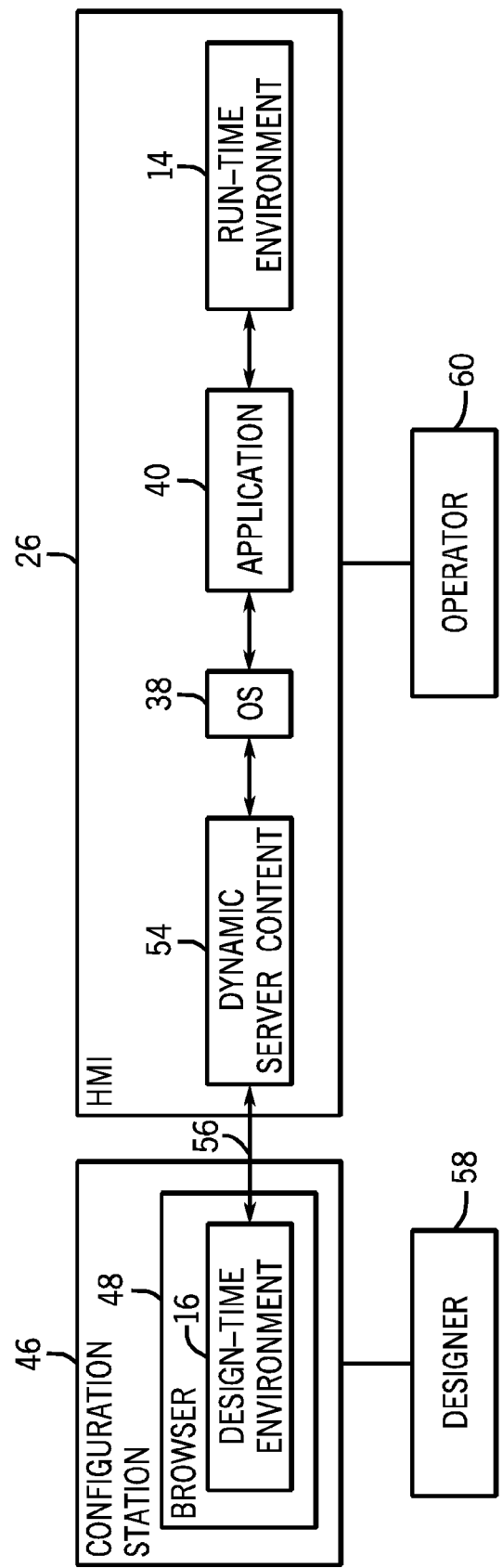
FIG. 3 is an overview of certain of the functional components in an interface and a configuration station in accordance with an embodiment of the present invention.

FIG. 3 is a high-level flow diagram representing interaction between an HMI and a configuration station. More detail regarding such processes is provided below. In general, a platform for the HMI and configuration station will include the operating system or executive software 38, application software 40, as well as any communication software, a microprocessor, a network interface, input/output hardware, generic software libraries, database management, user interface software, and the like (not specifically represented in FIG. 3). In the illustrated embodiment, a design-time platform and a run-time platform interact within the HMI. The design-time platform provides views that are served as the design-time environment 16 to a desktop personal computer platform (e.g., running a suitable operating system, such as Windows XP, Windows Vista, or Linux) and the run-time platform cooperates with the design-time platform via the operating system (e.g., Windows CE, Linux). The design-time platform provides dynamic server content 54, while the run-time platform displays views on the HMI itself (if a display screen is provided on the HMI). The design-time environment 16 is displayed in a browser 48 (e.g., Web browser or other general purpose viewer).

FIG. 3 represents at a very high level how the design-time environment 16 interacts with the operating system 38, application 40 and run-time environment 14. The arrow 56 represents dynamic exchange of content between the HMI 26 and configuration station 46. In general, interaction with the design-time environment is the task of a designer 58 who initially configures the HMI screens or views, device elements, their functions and interactions, or who reconfigures such software. The run-time environment is generally interacted with by an operator 60 directly at the HMI. It should be noted that while the design-time environment 16 has specific needs, in a current embodiment, it depends heavily on the operating system, application and run-time environment. The design-time environment 16 and the run-time environment 14 may utilize certain base technologies (e.g., DHTML, HTML, HTTP, dynamic server content, JavaScript, Web browser) to operate respectively in the design-time platform and run-time platform. While, in the illustrated embodiment, the run-time environment 14 and the design-time environment 26 reside on separate platforms, in some embodiments they may reside on the same platform. For example, the design-time platform and run-time platform may be configured as or considered a single platform.

In one embodiment of the present invention, a design-time Web implementation is utilized. This design-time Web implementation offers the speed and flexibility of software running on the design-time platform by using a Web browser (e.g., 48) with DHTML support from the HMI, as noted by the dynamic server content 54 in FIG. 3 and as described below. DHTML is used to perform dynamic manipulation of Web content in the design-time environment 16. Further, the dynamic server content 54 is used in the HMI to serve dynamic Web content to the design-time environment 16. This dynamic client-server environment allows the Web browser to simulate an application running on the design-time platform without requiring a piece of software compiled for a related processor.

Figure 4:
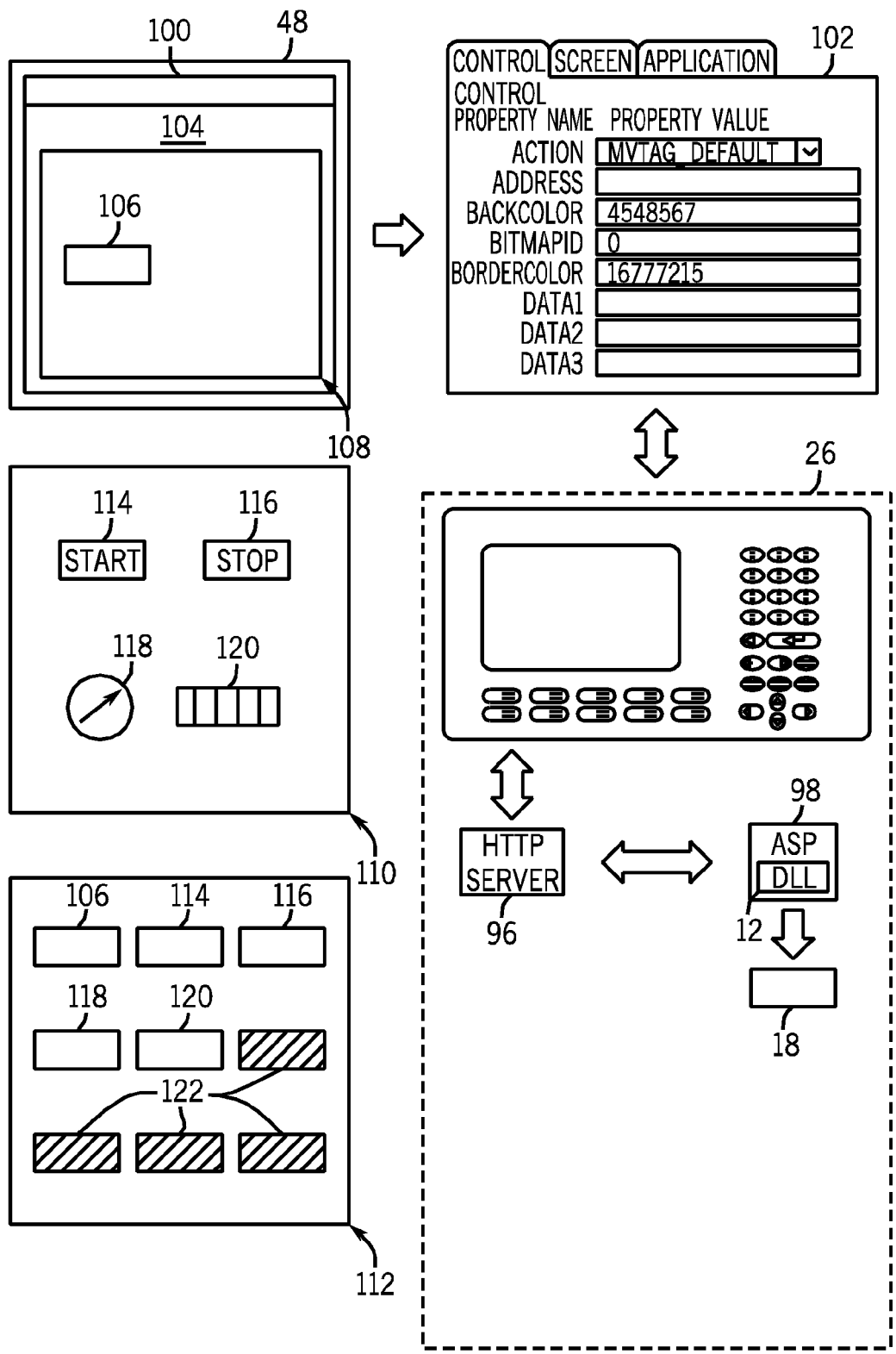
FIG. 4 is an overview of certain views or containers of device elements in accordance with an embodiment of the present invention.

FIG. 4 is a diagram illustrating one or more device elements in a design-time environment in accordance with embodiments of the present techniques. The diagram includes interactions illustrated by relationships between a display 100 (e.g., a screen for browser display), a property editor 102, and an HMI 26.

The design-time environment represented by the configuration screen or display 100 includes static content 104 and dynamic content. The dynamic content includes images corresponding to any displayed or represented device elements 106 (e.g., virtual on/off button, gauge). In one embodiment of the present techniques, the image is specified by an image tag in HTML and is part of a JPEG file created by the HMI as described below. The static content 104 may be created by the ASP server or it may preexist in an HTML file. It should be noted that, in some embodiments, designated designers only can edit the static content 104.

In the representation of FIG. 4, the device element representation 106 is contained within a view container 108. As will be appreciated by those skilled in the art, a container generally defines a portion of a processing space in which certain device elements are opened and ready for use. The container 108 may thus correspond to a first view container that includes only the elements viewable within the current screen. As discussed above, many such screens may be provided in the HMI. Other screens, such as alternative control or interface screens may be provided in other view containers, such as a container 110. In general, to speed the operation (e.g., changing between screen views) of the HMI, such view containers are predefined and associated with one another by definition of the individual device elements with which they are either associated or within which representations of the device elements are provided. A global container 112 is defined that include all of the device elements necessary for the various view containers, as well as other elements that may not be represented in any view container. As illustrated in FIG. 4, therefore, view container 108 includes the virtual button 106 which performs a "jog" function and is manifested by a representation in a first screen. New container 110 includes several components, such as a "start" button 114, a "stop" button 116, a virtual gage 118 and a digital readout 120. The global container 112, then, will include all of these device elements for the various view containers, as well as any device elements 122 that are required for operation of the viewable device elements but that are not themselves viewable. Such device elements may include elements that perform computations, trending, communications, and a wide range of other functions.

All device elements that are needed for the various views are opened during operation of the HMI and remain open in a single global container 112. However, utilizing aspects of current technologies, known as "tear-offs" any device elements that are not required for viewing or operation of a current view (i.e., a view currently displayed on the HMI or configuration station view) are reduced in size to reduce the memory requirements, processing requirements, and to facilitate operation of the HMI. The "torn-off" device elements nevertheless remain open and active such that change in between screen views is extremely rapid and efficient from memory utilization and processing standpoints.

FIG. 4 also illustrates a property editor 102 in which a user may access various properties of the element 106. As discussed above, the element 106 may also include connections and text associated with the element 106, which may also be configured by the user via an editor, similar to the property editor 102.

In an embodiment, the property editor 102 may interact with the HMI 26 a query string from the browser 48 to a server 96 (e.g., HTTP server) that is resident on the HMI 26. The server 96 cooperates with an ASP server 98 including a dynamic-link library (DLL) 122 to receive and respond to queries. The DLL 184 allows for storage of executable routines as separate files, which can be loaded when needed or referenced by a program. In the example set forth above, upon receiving the call, the page is reloaded by the ASP server 98 and the query string is initially parsed resulting in evaluation of the move command. Server side scripts then access the device element 18 related to the image 106 and to update its location property. The new property information is then updated on the page and the page is passed to the browser 48.

FIGS. 5A-5F depict a replication operation, e.g., a copy, performed on a device element 106 in accordance with an embodiment of the present invention. As explained further below, to improve performance and responsiveness of the browser 48, a copy of the device element may first be collected into an entity on HMI 26 before being sent to the browser 48. Advantageously, a user of the browser 48 will not perceive any differences in the replication operation and may perform a conventional copy and paste function. Further, a web browser 48 or other client accessing the interface may not have all of the information necessary to copy a device element. Thus, by bundling all of the data of a device element 106, the techniques described herein ensure that a copy of the device element 106 is identical and includes all of the properties, connections, text, and any other data included with the device element 106.

As illustrated in FIG. 5A, a web browser 48 includes a display 100 having static content 104 and dynamic content, as described above. A user may view a device element representation 106 contained within a view container 108. As mentioned above, the device element representation 106 may be any type of device element, e.g., object, such as a control, a gauge, an indicator, etc. Additionally, various non-viewable device elements may be included in a global container that may be required for the interface the user is managing or configuring. In an embodiment, a user may desire to configure an interface by adding or removing device elements in the view container 108, or, alternatively, in a global container.

In FIG. 5A, to manipulate a device element, a user may first select the device element representation 106 as indicated by dashed area 200. A user may select a copy operation using the interface loaded in the browser 48, thus initiating copy of the device element 18. The copy command may be sent to the HMI 26, as indicated by arrow 202. As illustrated, the device element 18 may include various data, such as properties 206, connections 208 (e.g., connections to other device elements), and text 210. The visual representation of the device element 106 on the web browser 48 is representative of the device element 106 and all of the additional properties 206, connections 208, and text 210, which are stored on the industrial automation device 30. As only visual representation 106 of the device element is displayed in the browser 48, the data making up the device element 18 is not stored on the browser 48, thus freeing up memory or other resources of the browser 48.

In accordance with an embodiment of the present invention, in response to the copy command executed by the user, the HMI 26 "bundles" all of the data of the device element 18 being copied into a separate entity 212, as illustrated in FIG. 5B and arrow 213. In an embodiment, the entity 212 may be referred to as a "Blob." Although the data of a device element may be stored in the entity 212, the entity 212 is not usable as the device element itself, but instead is used for storing, serializing, and transferring a device element and all of its associated properties, connections, and text. Additionally, as mentioned above, creating the entity 212 on the HMI 26 where the device element 18 is stored ensures that the replication operation will include all of the data associated with the device element 18.

After the entity 212, the entity 212 may be serialized and transferred to the web browser 48, as indicated by arrow 214, such as via HTTP or any suitable protocol. In one embodiment, the entity 212 may formatted in Extensible Markup Language (XML) format. In other embodiments, the entity 212 may be described in any suitable format. Further, in some embodiments, the entity 212 may be compressed before serialization and transfer, to minimize the size of the entity 212 and increase the speed of the transfer. Additionally, in alternate embodiments, the entity 212 may be stored in a non-volatile memory of the HMI 26, such as saved to a hard disk drive, flash memory, etc.

As indicated in FIG. 5C, the entity 212 may now be stored in the application running the web browser 48. The web browser 48 any application executing therein only stores the entity 212. Because the entity 212 is smaller than the device element 106, such as through data aggregation and compression as discussed above, the entity 212 uses significantly less resources of the web browser 48 and associated computer. Additionally, the web browser is only storing entities for those device elements that have been selected for replication operations, so not all device elements or entities thereof need to be stored.

Once a user has copied the device element 106, the user may paste the device element 106 to create a visual representation of an identical copy 216, as illustrated by arrow 217 and FIG. 5D. After the user selects a paste operation, the application and web browser 48 may send the entity 212 back to the HMI 26, as indicated by arrow 218 in FIG. 5E, via HTTP or other suitable protocol. Advantageously, the browser 48 does not need to interpret or unpack the entity 212, only store the entity in preparation for a subsequent paste operation. Additionally, the browser 48 does not need to manage specific data about every device element being replicated, thus reducing overhead and resource requirements.

Finally, as illustrated by arrow 218 and FIG. 5F, the HMI 26 may then unpack the entity 212, creating a new device element 220, and completing the paste operation. In one embodiment, the browser 48 and application may only transfer the entity from the last paste operation. Thus, if multiple copy operations have been executed, only the most recent paste operation completes the replication operation, so that the appropriate entity is sent to the HMI 26. Because a user expects to see all of the properties, connections, and text of the original device element 18 in the copied device element 218, bundling and then unpacking the entity 212 ensures that all such properties, connections, and text will be accessible in the copied device element 220. In addition to the advantages realized in the browser 48, because the entity 212 is used to represent a replication of the device element 106, the HMI 26 does not need to store all of the data to be copied, which reduces resource utilization in the event a device element is not pasted or the copy operation is canceled.

In some embodiments, more than one device element may be selected and replicated in the manner described above. For example, the selection and initiation of copying of multiple device elements may result in multiple entities, e.g. Blobs, being created on the HMI 26. Alternatively, in some embodiments, only one entity may be created for a multi-select and copy operation.

Figure 6:
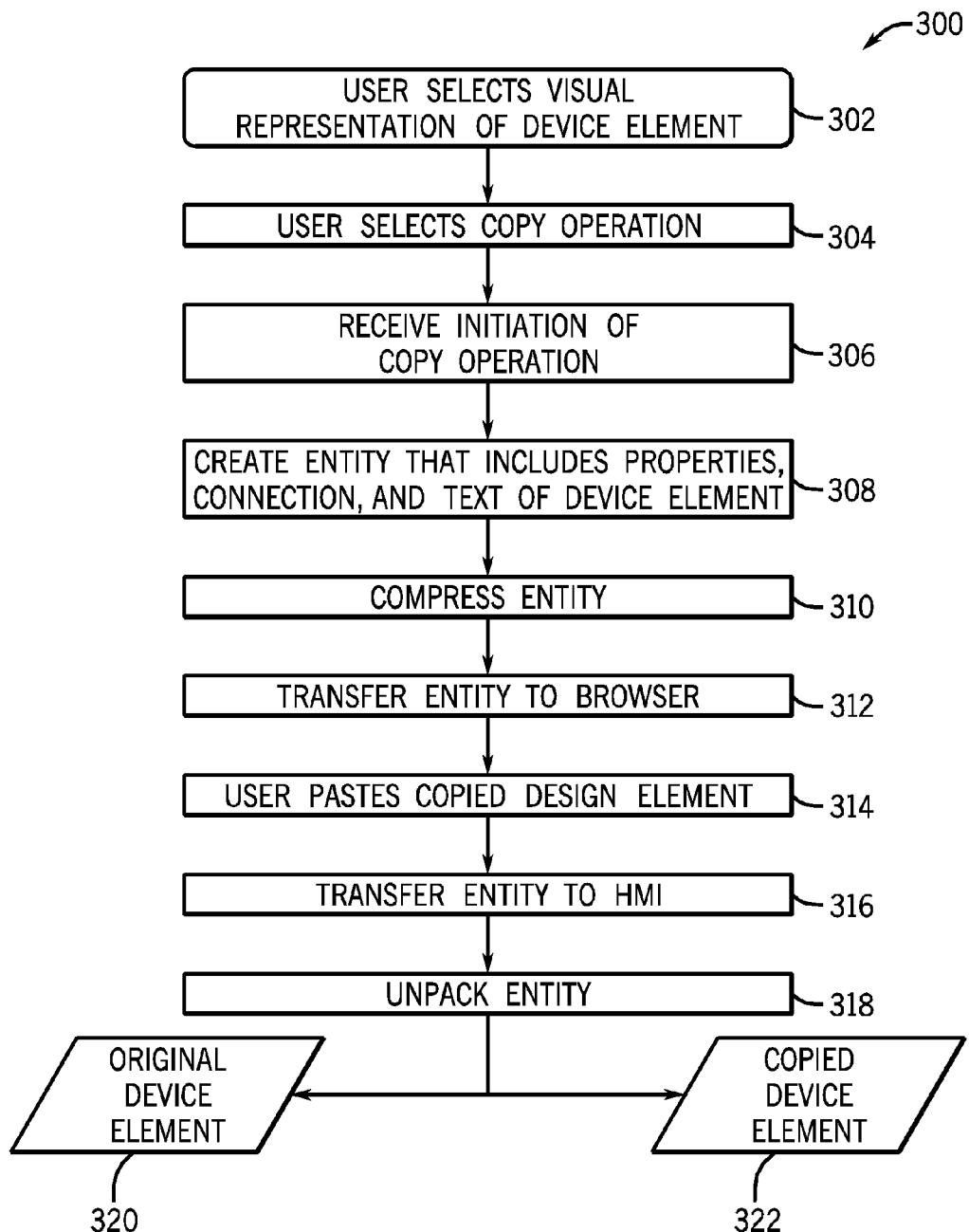
FIG. 6 is a flowchart illustrating a process for replication of a device element of an interface in accordance with an embodiment of the present invention.

FIG. 6 illustrates a process 300 for summarizing the replication of a device element in accordance with an embodiment of the present invention. Initially, a user may select a visual representation of a device element in a screen of a web browser (block 302) running an application, e.g. a design application for configuring an industrial automation device. A user may then select a copy operation on the selected device element (block 304). The initiation of the copy operation is communicated to the HMI (block 306), which then creates an entity that includes all of the properties, connections, and text included with the design element (block 308).

Once the entity for a design element is created, the entity may be compressed to reduce the size of the entity (block 310). After compression, the entity is serialized and transferred to the web browser and design application (block 312), via HTTP or any other suitable protocol. A user may complete the copy operation by pasting the copied device element (block 314). The paste operation initiates transfer of the entity from the web browser to the HMI (block 316). The industrial automation device deserializes and unpacks the entity, creating a copy of the original device element (block 318). Thus, at the end of the operation, two identical device elements (blocks 320 and 322) exist on the device and are visually represented in the browser.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
    storing a program object correlating a parameter of an industrial automation device, the object being configured to perform a function to monitor and/or control an industrial automation system, wherein storing the object comprises bundling the object;
    designating a visual representation of the object in a display screen of a workstation remote from the industrial automation device, wherein the visual representation is within a browser operative on the workstation, the browser not having information necessary to copy the object;
    accessing from the industrial automation device at least one of properties, connections, and text associated with the object in response to a trigger event originating from the remote workstation;
    generating an entity based upon the bundled object, wherein the entity is not itself usable as an object; and
    creating, via the entity, a copy of the object that includes the at least one of properties, connections and text associated with the object;
    wherein the method comprises transferring only data needed to create the visual representation to the remote workstation prior to creating the copy of the object.

2. The method of claim 1, wherein the entity is smaller than the object.

3. The method of claim 1, wherein the entity is smaller than the object after compression of the entity.

4. The method of claim 1, wherein the copy is created in the location where the object is stored.

5. The method of claim 1, wherein the copy is created in response to a second triggering event.

6. The method of claim 1, comprising transferring the entity from the industrial automation device.

7. The method of claim 1, wherein the copy comprises an identical copy of the object, comprising any properties, connections and text.

8. The method of claim 1, wherein the industrial automation device comprises a server functionality, and wherein the industrial automation device serves a representation of the object to the workstation.

9. The method of claim 1, wherein the entity is described via a markup language.

10. The method of claim 1, comprising sending the entity from the industrial automation device to a human machine interface via a hypertext transfer protocol.

11. A method, comprising:
    storing, in an industrial automation device or a library, a program object correlating a parameter for an industrial automation operation, the object being configured to perform a function to monitor and/or control an industrial automation system, wherein storing the object comprises bundling the object;
    designating a visual representation of the object in a display screen of a workstation remote from the industrial automation device, wherein the visual representation is within a browser operative on the workstation, the browser not having information necessary to copy the object;
    accessing from the industrial automation device or the library at least one of properties, connections, and text associated with the object in response to a trigger event originating from the remote workstation; and
    replicating the object from a different industrial automation device configured to perform the industrial automation operation;
    wherein the method comprises transferring only data needed to create the visual representation to the remote workstation prior to replicating the object.

12. The method of claim 11, wherein the object is replicated by first generating an entity based upon the object.

13. The method of claim 11, wherein the industrial automation device comprises a server functionality, and wherein the industrial automation device serves a representation of the object to the workstation.

14. A method, comprising:
    storing, in an industrial automation device or a library, a program object correlating a parameter for an industrial automation operation, the object being configured to perform a function to monitor and/or control an industrial automation system, wherein storing the object comprises bundling the object;
    accessing from the industrial automation device or the library at least one of properties, connections, and text associated with the object via a visual representation is within a browser operative on a workstation, the browser not having information necessary to copy the object; and
    based on the accessed at least one of properties, connections, and text, replicating the object from a different industrial automation device configured to perform the industrial automation operation;
    wherein the method comprises transferring only data needed to create the visual representation to the remote workstation prior to replicating the object.

15. The method of claim 14, comprising designating a visual representation of the object in a display screen of a workstation remote from the industrial automation device.

16. The method of claim 15, comprising accessing the at least one of properties, connections, and text associated with the object in response to a trigger event originating from the remote workstation.

17. The method of claim 14, wherein the object is replicated by first generating an entity based upon the object.

18. The method of claim 14, wherein the industrial automation device comprises a server functionality, and wherein the industrial automation device serves a representation of the object to a remote workstation.

* * * * *